United States Patent [19]
Takahashi et al.

[11] 3,942,083

[45] Mar. 2, 1976

[54] BRUSHLESS MOTOR

[75] Inventors: Tadashi Takahashi; Kazuo Onishi, both of Hitachi, Japan

[73] Assignee: Hitachi, Ltd., Japan

[22] Filed: Aug. 19, 1974

[21] Appl. No.: 498,657

[30] Foreign Application Priority Data
Aug. 24, 1973 Japan.................................. 48-94377

[52] U.S. Cl.................................. 318/138; 318/254
[51] Int. Cl.²......................................... H02K 29/00
[58] Field of Search............................ 318/138, 254

[56] References Cited
UNITED STATES PATENTS

| | | |
|---|---|---|
| 3,488,566 | 1/1970 | Fukuda................. 318/138 |
| 3,504,252 | 3/1970 | Moczala et al. .................... 318/138 |
| 3,688,172 | 8/1972 | Sieber et al..................... 318/138 X |
| 3,716,769 | 2/1973 | Brunner............................. 318/254 |
| 3,839,661 | 10/1974 | Wada................................. 318/138 |

Primary Examiner—Gene Z. Rubinson
Attorney, Agent, or Firm—Craig & Antonelli

[57] ABSTRACT

A brushless motor with a permanent magnet as a rotor is disclosed in which the rotational position of the rotor is detected by Hall elements thereby to control a transistor, which in turn is used to control the current flowing in the stator winding.

14 Claims, 4 Drawing Figures

BRUSHLESS MOTOR

BACKGROUND OF THE INVENTION

1. Field of the Invention

This invention relates to a brushless motor, or more in particular to a brushless motor using a semiconductor switching element, especially a transistor switching element.

2. Description of the Prior Art

A brushless motor is well known which comprises a rotor made of a magnetized permanent magnet and a stator provided around the rotor in spaced relationship therewith, so that the current in the stator windings is controlled by magnetically detecting the rotor position. In many of this type of small-sized brushless motor, a transistor is used as a switching means to control the current in the stator windings. As is well known, the transistor has an emitter, a collector and a base and controls the current between the emitter and collector by means of the current flowing in the base, except for the field effect transistor in which the current is controlled by a gate voltage. The control range of these transistors including the thyristor, however, depends on the magnitude of voltage and it is difficult to accomplish the switching operation successfully in an electrical circuit involving a high voltage. It is possible to widen the control range by the use of a transistor with a high breakdown voltage, but it has the disadvantage of high cost. Further, it is technically difficult to provide a high breakdown voltage in an integrated circuit construction of the control circuit network.

On the other hand, a voltage is often induced by the inductance in the winding when the motor winding current is controlled, especially when the winding current is cyclically cut off. The magnitude of the induced voltage, the generation of which is only for a short duration, is proportional to the speed with which the current is cut off, the magnitude of the current cut off and the magnitude of the inductance. Therefore, if a transistor with a comparatively low breakdown voltage is to be used, some measure must be taken to prevent the generation of the induced voltage.

Also, it is necessary to review such a preventive measure when the voltage induced in the stator windings by the rotation of the rotor is utilized in automatically regulating the motor at a constant speed.

SUMMARY OF THE INVENTION

Accordingly, it is an object of the invention to provide a brushless motor constructed of a semiconductor switch low in breakdown voltage.

Another object of the invention is to provide a brushless motor the speed of which is controllable.

A further object of the invention is to provide a brushless motor the circuits of which are easily integrated.

According to one aspect of the invention, in a brushless motor having a permanent magnet rotor the rotational position of which is detected to control a semiconductor switch for controlling the current in the stator windings, a bypass circuit is connected in parallel to the stator windings so as to absorb an induced voltage in excess of the voltage induced in the stator windings by rotor rotation.

DESCRIPTION OF THE PREFERRED EMBODIMENTS

Figure 1:
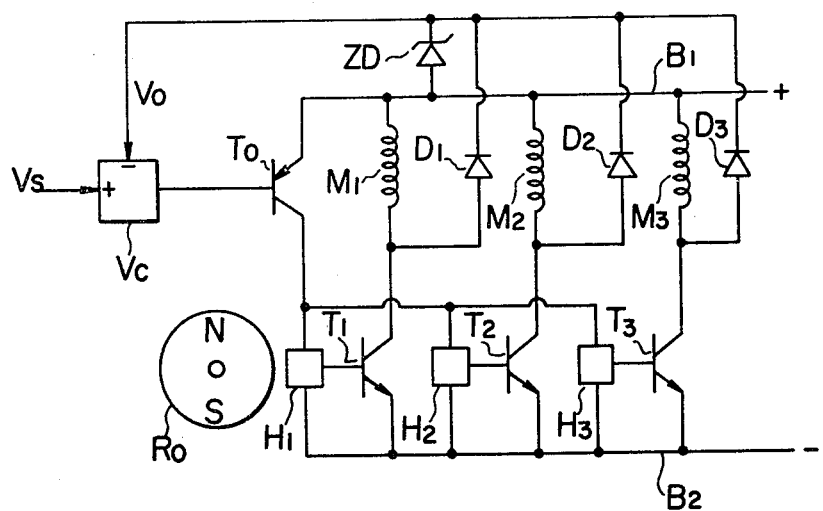
FIG. 1 is a circuit diagram showing an electrical connection of the brushless motor according to the invention.

The electrical connections of the brushless motor according to the invention will be described with reference to FIG. 1. Reference symbols $M_1$, $M_2$ and $M_3$ show stator windings each of which is connected commonly to the positive power line $B_1$ at one end thereof and the other end thereof to the collectors of NPN transistors $T_1$, $T_2$ and $T_3$. The emitters of the transistors $T_1$ to $T_3$ are connected to the negative power line $B_2$. Reference symbols $H_1$, $H_2$ and $H_3$ show Hall elements which may be alternatively composite circuits including amplifier circuits and the like and produce an output under the influence of the N pole magnetic field of the rotor $R_0$ thereby to supply base current to corresponding transistors $T_1$ to $T_3$ respectively. One of the bias terminals of each of the Hall elements $H_1$ to $H_3$ is connected commonly to the negative power line $B_2$, while the other terminal thereof is connected in common to the collector of transistor $T_0$. Symbols $D_1$, $D_2$ and $D_3$ show diodes the anodes of which are connected to the ends of the stator windings $M_1$ to $M_3$ respectively on the side of the collectors of the transistors $T_1$, $T_2$ and $T_3$, the cathodes thereof being connected in common to the reference terminal of the voltage comparator VC. ZD shows a zener diode inserted between the junction point of the cathodes of the diodes $D_1$ to $D_3$ and the power line $B_2$ in such a manner that the zener diode is energized to form a bypass for the stator windings $M_1$ to $M_3$ when the cathode output voltage exceeds the threshold level over the speed voltage induced in the stator windings $M_1$ to $M_3$ by the rotation of the rotor $R_0$. Therefore, the zener voltage of the zener diode ZD may be equal to the level, which is not desired to be delivered as an output, over the speed voltage induced in the stator windings $M_1$ to $M_3$ in response to the maximum rotational speed expected to the rotor $R_0$ so that it need not be energized by a voltage lower than such a speed voltage level. The transistor $T_0$ is of PNP type and has an emitter connected to the power line $B_1$, the base thereof being connected to the output terminal of the voltage comparator VC. The voltage comparator VC which comprises a differential amplifier circuit or the like is provided for the purpose of comparing the speed voltage $V_0$ with the reference voltage $V_S$ so that the base current of the transistor $T_0$ is increased when $V_S$ is higher than $V_0$.

Figure 2:
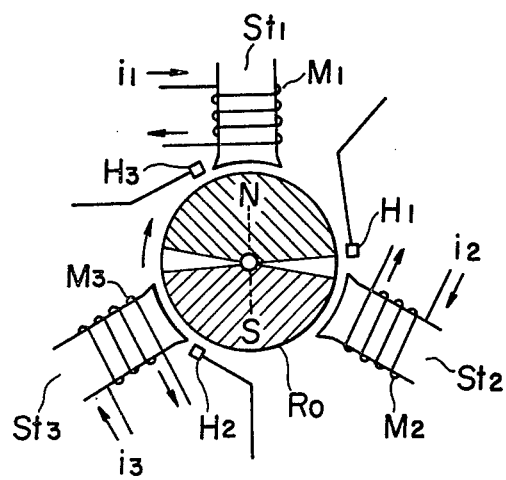
FIG. 2 is a diagram schematically showing the construction of the brushless motor according to the invention.

Next, the relation of the physical positions of the rotor $R_0$, stator windings $M_1$ to $M_3$ and the Hall elements $H_1$ to $H_3$ will be explained with reference to FIG. 2.

Reference symbols $St_1$, $St_2$ and $St_3$ show stator cores with their magnetic axes arranged at 120° and with the stator windings $M_1$ to $M_3$ wounded thereon in such a direction that the currents $i_1$, $i_2$ and $i_3$ flow in the directions of the arrows and each of the stator cores forms an N pole. The Hall elements $H_1$ to $H_3$ are also arranged at angular intervals of 120°.

The magnetization of the magnetic poles of rotor $R_0$ around the magnetic axes is effected as follows: The stator cores $St_1$ to $St_3$, Hall elements $H_1$ to $H_3$ and rotor $R_0$ are arranged in such a way that the Hall element $H_1$ enters a working stage under the magnetic fluxes of the N pole of the rotor $R_0$ immediately after the passage of the N pole magnetic axis of the rotor $R_0$ through the magnetic axis of the stator core $St_1$, while the Hall element $H_3$ is released from the N pole and enters a cut-off phase immediately before the magnetic axis of the S pole reaches the magnetic axis of the stator core $St_3$. Instead of the foregoing arrangement in which the Hall elements are energized by the magnetic fluxes of N pole, the currents $i_1$ to $i_3$ may be made to flow in the opposite direction in the stator windings if the Hall elements are to be energized by the magnetic fluxes of S pole.

Figure 3:
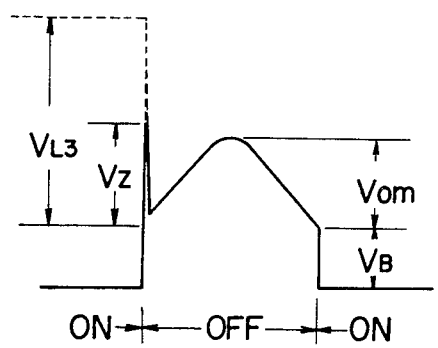
FIG. 3 shows a waveform of the emitter-collector voltage of the switching transistor.

The operation of the brushless motor according to the invention will be explained below. In the state shown in the drawings, the Hall element $H_3$ is under the N pole of rotor $R_0$ and therefore the transistor $T_3$ is in the conductive state, so that current $_3$ flows in the stator winding $M_3$ and therefore the stator core $St_3$ is magnetized to the N polarity. As a result, the stator core $St_3$ attracts the S pole of the rotor $R_0$ thereby to generate torque in the direction as shown by the arrow. At this time, the emitter-collector voltage $V_{T3}$ of transistor $T_3$ is in the ON phase as shown in FIG. 3. When rotor $R_0$ begins to rotate and the periphery of the N pole of the rotor $R_0$ reaches a position opposite to the Hall element $H_1$, the transistor $T_1$ is energized in like manner, and the transistor $T_3$ is eventually cut off as the Hall element $H_3$ is released from the N pole. Under this condition, the voltage liable to be induced in the stator winding $M_3$ is $$V_{L3} = L_3 \frac{di_3}{dt}$$

where $L_3$ is the inductance of the stator winding $M_3$, $di_3$ the cut-off current and $dt$ the cut-off speed or cut-off time. As shown in FIG. 3, however, when the induced voltage $V_{L3}$ reaches the zener voltage $V_Z$ of the zener diode ZD, a current flows in the closed circuit including the stator winding $M_3$, diode $D_3$, zener diode ZD and stator winding $M_3$, with the result that the induced voltage $V_{L3}$ is dampened by the zener voltage $V_Z$. Therefore, the voltage applied to the transistor $T_3$ is dampened by the sum of the source voltage $V_B$ and zener voltage $V_Z$. In this way, when the transistor $T_3$ enters a conductive state, the source voltage $V_B$ as well as the induced voltage $V_{0m}$ in the stator winding $M_3$ due to the S pole are applied between the emitter and collector of the transistor $T_3$. The induced voltage $V_{0m}$, which is directly proportional to the rotational speed of the rotor $R_0$, is applied to the comparator $V_C$ as a speed voltage $V_0$ through the diode $D_3$ and compared with the reference voltage $V_S$. If $V_S$ is lower than $V_0$, the transistor $T_0$ is cut off or its collector current reduced thereby to reduce the bias current in the Hall elements $H_1$ to $H_3$ and hence the output current thereof, so that the current made to flow in the stator windings $M_1$ and $M_2$ by the transistors $T_1$ and $T_2$ is reduced. If $V_0$ is lower than $V_S$, on the other hand, the reverse is the case, resulting in an increased current flowing in the stator windings $M_1$ and $M_2$. In view of the fact that the rotational torque generated in the rotor $R_0$ is proportional to the current in the stator windings $M_1$ to $M_3$, a constant speed control is made possible by regulating the magnitude of the current according to the magnitude of the speed voltage $V_0$ as explained above. By the way, if the set speed is to be changed, it is easily achieved by changing the reference voltage $V_S$ applied to the voltage comparator VC.

Figure 4:
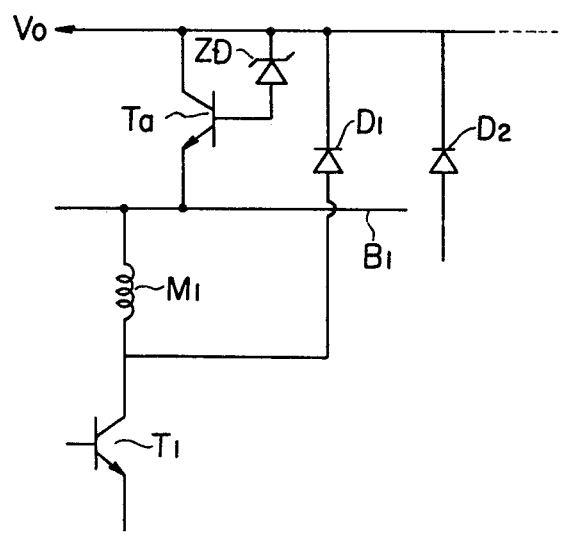
FIG. 4 is a circuit diagram showing the electrical connection of a modification of the bypass circuit.

Next, a modification of the bypass circuit will be explained with reference to FIG. 4. The anode of the zener diode ZD is connected to the base of the NPN transistor Ta, the collector of which is connected to the cathodes of the diodes $D_1$ to $D_3$, the emitter thereof being connected to the power line $B_1$. In this circuit, the current flowing in the zener diode ZD is amplified into the emitter-collector current of the transistor Ta, thus making it possible to reduce the current capacity of the zener diode ZD.

The present invention may be modified as mentioned below without departing from the spirit of the inventionn.

[Relationship of physical positions of the rotor, stator and Hall elements]

The rotational torque of the rotor is generated by the electromagnetic attractive force or repulsive force between the rotor and stator, whereas the Hall elements regulate the electromagnetic opposite polarities of the rotor and stator in such a manner as to fix the direction of the attractive force or repulsive force therebetween. Therefore, the range of rotor magnetization, shape of the stator cores and the physical positions of the Hall elements may be modified so far as the above-mentioned principle is maintained.

[Hall elements]

Even though the brushless motor according to the present invention employs Hall elements as rotor position detector means for convenience of illustration, they may be replaced by other appropriate magnetically sensitive elements capable of detecting the relative positions of the rotor and stator in response of the magnetic polarity of the rotor. Also, a photo-electric conversion system may be used to detect the position of the rotor.

[Zener diode]

In view of the fact that a bypass circuit in parallel to the stator windings is formed to prevent the increase in the induced voltage in the stator winding when it exceeds the voltage induced due to the rotor rotation, the zener diode may be replaced by another type of semiconductor element or circuit having similar characteristics.

We claim:

1. A brushless motor comprising a rotor with a permanent magnet, a stator with stator windings disposed around the rotor at spaced intervals, a plurality of first control means each associated with respective ones of said stator windings for producing an output in accordance with the rotational position of the rotor, and an electric control circuit for controlling a current flowing through each of the stator windings in accordance with the output of said first control means, wherein said electric control circuit comprises a plurality of transistors connected in series with respective stator windings, the control terminals of said transistors being connected with the output of respective ones of said first control means, voltage comparator means for comparing a reference voltage and the voltage induced in each of said stator windings in accordance with the rotation of said rotor, second control means for controlling said first control means in response to the output of said voltage comparator means, and bypass circuit means connected in parallel with each of said stator windings for allowing a current due to a voltage induced in each of the stator windings to flow back to the stator windings, said bypass circuit comprising a constant voltage element to eliminate a voltage level higher than the level of said voltage induced in accordance with the rotation of the rotor.

2. A brushless motor according to claim 1, in which said constant voltage element consists of a zener diode.

3. A brushless motor according to claim 1, in which said bypass circuit comprises a transistor in parallel to said stator windings, and said constant voltage element consists of a zener diode for controlling the base current of said transistor.

4. A brushless motor according to claim 1, in which said first control means comprises a plurality of Hall elements arranged around said rotor, the output terminals of said Hall elements being connected to said control terminals of said transistors respectively.

5. A brushless motor according to claim 4, in which the bias terminals of said Hall elements are connected to the output of said second control means.

6. A brushless motor comprising a rotor having a permanent magnet, a stator including a plurality of cores disposed about said rotor at spaced intervals and a stator winding disposed on each core, a plurality of transistors each connected in series with one of said stator windings and each having a control terminal, a plurality of control means each associated with a respective one of said stator windings for applying to the control terminal of the transistor connected to the associated stator winding an output in accordance with the rotational position of said rotor, and bypass circuit means connected in parallel with each stator winding for short-circuiting said stator winding in response to induction in said stator winding of a voltage above a predetermined level.

7. A brushless motor as defined in claim 6 wherein said bypass circuit means comprises a zener diode.

8. A brushless motor as defined in claim 7, further comprising a plurality of diodes each connected between one side of a respective stator coil and a common point to which one side of said zener diode is connected, the other side of said zener diode being connected to the other side of each of said stator coils, and speed control means connected to each of said diodes and to each of said control means for controlling the speed of the motor.

9. A brushless motor as defined in claim 8 wherein said control means each comprise a Hall effect element disposed at a preselected position with respect to said rotor.

10. A brushless motor as defined in claim 9 wherein said speed control means includes a voltage comparator having one input connected to the point of connection of said diodes and said zener diode and a second input for receiving a reference voltage, and a control transistor connected between the end of each stator winding connected to said zener diode and each Hall effect element, the output of said voltage comparator being connected to the control terminal of said control transistor.

11. A brushless motor as defined in claim 6 wherein said bypass circuit means comprises a bypass transistor connected across said stator windings and a zener diode connected between the control terminal of said bypass transistor and one side of each stator winding.

12. A brushless motor as defined in claim 11, further comprising a plurality of diodes each connected between said one side of a respective stator coil and a common point to which one side of said zener diode is connected, and speed control means connected to each of said diodes and to each of said control means for controlling the speed of the motor.

13. A brushless motor as defined in claim 12 wherein said control means each comprise a Hall effect element disposed at a preselected position with respect to said rotor.

14. A brushless motor as defined in claim 13 wherein said speed control means includes a voltage comparator having one input connected to the point of connection of said diodes and said zener diode and a second input for receiving a reference voltage, and a control transistor connected between the end of each stator winding connected to said zener diode and each Hall effect element, the output of said voltage comparator being connected to the control terminal of said control transistor.

* * * * *